May 1, 1962  R. H. WELLS  3,032,063
COMBINED CHECK AND CHOKE VALVE DEVICE
Filed March 29, 1960
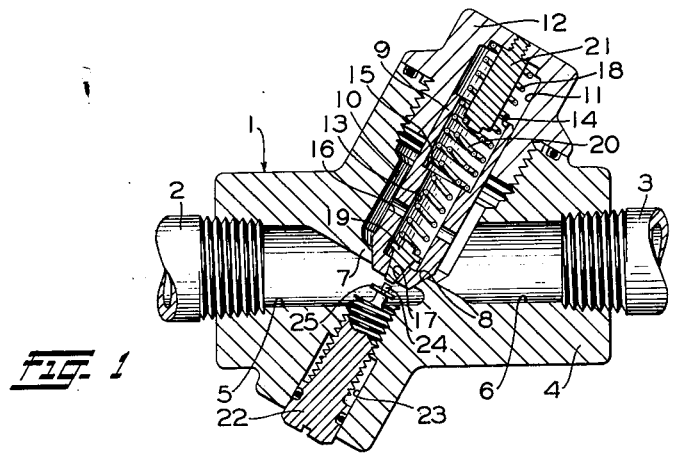
Fig. 1
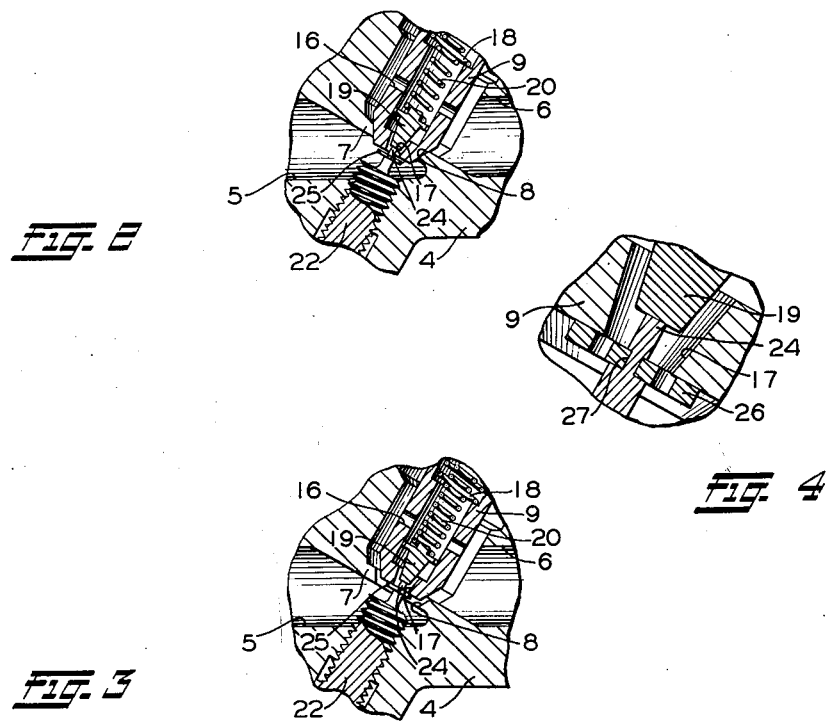
Fig. 2
Fig. 4
Fig. 3
INVENTOR.
Richard H. Wells
BY
*A. A. Steinmiller*
Attorney United States Patent Office 3,032,063
Patented May 1, 1962

3,032,063
COMBINED CHECK AND CHOKE VALVE DEVICE
Richard H. Wells, Pittsburgh, Pa., assignor to Westinghouse Air Brake Company, Wilmerding, Pa., a corporation of Pennsylvania
Filed Mar. 29, 1960, Ser. No. 18,341
2 Claims. (Cl. 137—599.2)

This invention relates to combined check and choke valve devices providing free flow of fluid in one direction through a conduit and restricted flow of fluid in the reverse direction and has particular relation to such valve devices which are adjustable to obtain a wide range of restricted flow capacities.

Flow control valve devices of the combined check and choke type commonly use a check valve of the swing or lift type to provide free flow of fluid in one direction through a conduit and a choke to provide restricted reverse flow. It has been proposed to control the rate of restricted flow in the reverse direction by manually adjustable screw means for unseating the check valve different degrees away from a corresponding check valve seat. However, where such valve devices are utilized to regulate the charging and discharging of timing volumes which control delayed operation of switches, relay valves, and the like, the restricted flow through the valve device is of relatively large capacity within a narrow range as a consequence of the restricted flow characteristic of these check valves which makes them adaptable for use with relatively large timing volumes but unsuitable for use with small timing volumes requiring small capacity flow.

It is the object of this invention to provide an improved check and choke valve device of the type heretofore mentioned characterized by means for adjusting the valve device to obtain selectively a range of relatively small restricted flow capacities or a range of relatively larger restricted flow capacities.

According to this object there is provided an improved check and choke valve device of the above type comprising a casing having an inlet port and an outlet port, each adapted to be connected to a conduit, a pair of valve members consisting of a main check valve biased to a seat on the casing and a needle valve biased to a seat on the check valve, and adjusting screw means accessible from the exterior of the casing for manually selectively adjusting the position of the needle valve only or of both valve members to variously restrict the reverse flow of fluid in the conduit while permitting relatively unrestricted flow of fluid under pressure past the valve members from the inlet port to the outlet port.

In the accompanying drawings,

FIG. 1 is a sectional view of the improved combined check and choke valve device adjusted to provide relatively unrestricted flow of fluid in one direction only through the conduit;

FIG. 2 is a fragmentary view of FIG. 1 showing the needle valve component positioned to provide a selected rate of reverse flow within a small capacity restricted flow range.

FIG. 3 is a fragmentary view of FIG. 1 showing the main valve component positioned to provide a selected rate of reverse flow within a large capacity restricted flow range; and FIG. 4 is a fragmentary view, on a larger scale, showing a modified and preferred construction of the adjusting screw shown in the previous figures.

Description

In FIG. 1 of the drawing, the combined check and choke valve device 1 embodying the invention is shown connected in a conduit in which fluid under pressure may flow in one or the reverse direction, the several sections of the conduit being identified by the reference numerals 2 and 3.

The device 1 comprises a casing 4 in which are an inlet port 5 and an outlet port 6, each port having internal threads at its outer end and for receiving the threaded end of respective sections 2 and 3 of the conduit. Ports 5 and 6 are separated at their inner ends by a transverse diagonal casing wall 7 having a tapered bore 8 therethrough for permitting communication of fluid under pressure between the ports 5 and 6, the tapered bore serving as a valve seat with the larger diameter of the tapered bore 8 opening into port 6.

A hollow main check valve member 9, disposed in a bore 10 that extends through the casing wall and opens into port 6, is arranged to seat on the valve seat 8. Valve member 9 has an annular tapered surface, conforming to the tapered valve seat 8, that connects a tubular skirted portion to a valve face portion subject to fluid pressure in port 5. The axis of bore 10 is in axial alignment with valve seat 8 and the skirted portion of valve member 9 is slidably reciprocable adjacent its outer end within a corresponding bore 11 of a cap screw 12 screwed into the outer threaded end of bore 10.

Valve member 9 has an axial bore 13 and a counterbore 14 joined by a shoulder 15. A plurality of ports 16 in the wall of the skirted portion of the valve member 9 provide communication between the bore 13 and the circular space in bore 10 around the valve member 9. A tapered orifice 17 in the end wall of valve member 9 provides communication between the bore 13 and the inner end of port 5.

A helical spring 18, contained within counterbore 14 of valve member 9, seats at one end on the shoulder 15 and is backed up at its other end against the end wall of bore 11 in cap screw 12, thereby biasing the valve member 9 toward and into seated relation on the valve seat 8.

A needle valve member 19 of relatively small size is disposed concentrically within orifice 17 in the main check valve member 9 and is biased in the same direction as valve member 9 into seating contact with a valve seat formed by the orifice 17 by a coaxial spring 20. Spring 20 is arranged coaxially within spring 18 and is backed up at one end by a pin 21 screwed into the end wall of cap screw 12 and at its opposite end contacts a collar formed around the larger diameter of needle valve member 19, the collar serving to guide the needle valve member in bore 13 of check valve member 9.

An adjusting screw 22 is sealingly screw-threaded into a partially threaded diagonal bore 23 extending through the casing wall at the opposite side of and in axial alignment with bore 10, the inner end of bore 23 opening into port 5. The inner end of screw 22 has a narrow stem 24 of smaller diameter than tapered orifice 17 and in axial alignment with needle valve member 19 to permit stem 24 to enter the orifice 17 and to raise valve member 19 away from its seat against the force of spring 18. A notched or perforated collar 25 is fixed on the stem 24 a predetermined distance from the end thereof. Collar 25 may be formed integral with stem 24, as shown in FIGS. 1, 2 and 3, but a preferred embodiment is shown in FIG. 4 wherein collar 25 is in the form of a perforated snap ring 26 seated within an annular groove 27 provided on stem 24.

Screw 22 has a slot on its outer end to permit screw adjustment inward and outward of bore 23. When screw 22 is turned inward a predetermined distance, the inner end of stem 24 engages the face of needle valve member 19 and lifts the latter from its seat. When valve member 19 is so positioned, fluid may be throttled past the valve member from port 6 to port 5 via ports 16 in the skirted portion of valve member 9 over a low capacity restricted flow range.

When screw 22 is turned inward to a point where collar 25 engages the face of valve member 9, stem 24 will have lifted needle valve member 19 to its full open position. It will be noted that collar 25 is provided with notches or holes to permit fluid under pressure to flow past or through the collar when the latter is in engagement with valve member 9. Further inward adjustment of the screw 22, after collar 25 has engaged check valve member 9, will cause collar 25 to lift valve member 9 from its seat in successive degrees to its full open position through a high capacity restricted flow range.

Thus by progressive inward movement of the adjusting screw 22, a wide range of flow control and a sensitive adjustment of the rate of reverse flow is obtained.

*Operation*

In operation, assume that the improved check and choke valve device 1 is interposed in a conduit, that check valve member 9 and needle valve member 19 are biased into seated positions by springs 18 and 20 respectively, that adjusting screw 22 is turned outwardly of casing 4 to a degree where stem 24 is out of contact of needle valve member 19, as shown in FIG. 1, and that the conduit sections 2 and 3 and device 1 are devoid of fluid under pressure.

If conduit section 2 is then charged with fluid under pressure, fluid will flow to port 5 and will act on the face of check valve member 9 to cause the latter to unseat, against the force of springs 18 and 20, allowing fluid to flow past the valve seat 8 to port 6 and conduit section 3 without substantial restriction. Spring 20 maintains needle valve member 19 seated when valve member 9 is thus unseated, the needle valve member being carried upward by main check valve member 9.

If the pressure of fluid in conduit section 2 is subsequently reduced below that in conduit section 3, fluid will begin to flow in the opposite direction, that is, from port 6 to port 5, and valve members 9 and 19 will be urged downwardly, by the pressure of fluid in port 6 acting on the valve members and by the force of springs 18 and 20, into seated positions on their respective seats, thereby cutting off flow of fluid from port 6 to port 5. Thus, in this adjusted condition the improved device 1 can be used to provide only substantially unrestricted flow in one direction in the conduit.

Assume now that it is desired to control the flow of pressure of fluid in the reverse direction, that is, from port 6 to port 5, at a selected restricted rate while still permitting free flow in the one direction. Control of the rate of reverse flow is obtained by turning the adjusting screw 22 inward of the casing. Inward movement of the screw 22 brings the stem 24 into engagement with needle valve member 19 and once member 19 is thus engaged, stem 24 will begin to unseat member 19 selected increments away from orifice 17, corresponding to the inward movement of screw 22, to provide progressively increasing rates of flow of fluid past the orifice 17 within a low capacity flow range. When adjusting screw 22 is turned inward to a point where collar 25 contacts main check valve member 9, full adjustment of needle valve member 19 is attained and the latter valve member will be in a full open position to permit maximum flow past orifice 17. It will be noted that collar 25, although engaging main check valve member 9, does not restrict reverse flow therepast but provides a path of flow via the notches therein.

FIG. 2 shows needle valve member 19 positioned by adjusting screw 22 to establish a predetermined rate of restricted flow past the orifice 17 between a zero and maximum rate over a low flow capacity range. A fine, sensitive adjustment of the reverse rate of flow within a low capacity range is thus provided.

If, after the adjusting screw 22 is screwed inward to a point where collar 25 on the screw engages check valve member 9 at which maximum reverse rate of flow past the needle valve member 19 occurs, a higher reverse rate of flow is desired, adjusting screw 22 may be turned further inward to unseat main check valve member 9 by successive increased increments corresponding to the degree of inward adjustment of screw 22. When main check valve member 9 is thus unseated, fluid under pressure will flow from port 6 to port 5 past valve seat 8, thereby augmenting flow of fluid through orifice 17 and providing a selected reverse rate of flow in a high capacity range. Main check valve member 9 may be unseated to assume a full open position for providing a maximum rate of restricted flow in the reverse direction past valve seat 8.

FIG. 3 shows the main check valve member 9 positioned by adjusting screw 22 to establish a predetermined rate of restricted flow past valve seat 8 between a zero and maximum rate over a high flow capacity range.

Having now described the invention, what I claim as new and desire to secure by Letters Patent, is:

1. A check and choke valve device of the type for providing relatively unrestricted flow of fluid in one direction in a conduit and controlled restricted flow in the opposite direction, said device comprising a casing interposed in the conduit and providing a pair of ports connectable to respective sections of the conduit; a wall in said casing separating said ports and having an opening formed therein providing a valve seat; a check valve biased into seated position on said valve seat and yieldingly unseated by pressure of fluid thereon to permit flow therepast in said one direction from one of said ports to the other of said ports and being reseatable upon a flow in said opposite direction from said other port, said check valve means including a tubular skirt portion guided in said casing and being formed with a longitudinal bore, radial port means formed in said skirt portion for providing communication between said bore and said other port, a tapered orifice provided in said check valve coaxial with said bore and having its narrow end disposed in the direction of said one port and providing a second valve seat, a needle valve formed complementary to said orifice and biased into seated relation on said second valve seat; and manually adjustable means carried by and movable relative to said casing means, said manually adjustable means including a stem formed thereon of substantially constant diameter along its length and of lesser cross-sectional area than the area of the smaller end of said orifice for engaging said needle valve to effect unseating thereof from its seat to selective degrees thereby to correspondingly vary the restriction to reverse flow of fluid through said orifice from said other port to said one port, and a collar on said stem spaced inwardly of the terminal end for engaging said check valve after said needle valve is unseated to effect unseating of said check valve from its seat to selected degrees thereby to increase selectively said flow capacity from said other port to said one port, said collar having a plurality of openings therein arranged to permit substantially unimpeded flow of fluid past said unseated needle valve and through said orifice.

2. A check and choke valve device, as described in claim 1, further characterized by two coaxially arranged helical springs within the longitudinal bore, one of which is interposed between said check valve and said casing means and exerts a yielding biasing force on said check valve urging it toward seated position on its valve seat, and the other of which is interposed between said needle valve and said casing means and exerts a yielding biasing force on said needle valve urging it toward seated position on its valve seat.

References Cited in the file of this patent
UNITED STATES PATENTS

| | | |
|---|---|---|
| 2,259,809 | Freeman | Oct. 21, 1941 |
| 2,265,496 | Shaw | Dec. 9, 1941 |
| 2,365,892 | McLeod | Dec. 26, 1944 |